Oct. 19, 1926.

G. O. WILKINSON

ROTOR COIL SHAFT SUPPORT

Filed May 11, 1925

1,603,822

INVENTOR.
Gordon O. Wilkinson
BY
Cyrus N. Anderson
ATTORNEY.

Patented Oct. 19, 1926.

1,603,822

UNITED STATES PATENT OFFICE.

GORDON O. WILKINSON, OF ARDMORE, PENNSYLVANIA.

ROTOR-COIL-SHAFT SUPPORT.

Application filed May 11, 1925. Serial No. 29,319.

In the manufacture of variometers, variocouplers, and the like, it is desirable that means be provided for firmly supporting the stub-shafts upon the inner ends of which the rotor coil frames are supported.

The general object of the present invention is to provide and rigidly secure to the coil supporting frame of such a structure means upon which the stub-shafts for supporting the rotor coil frame may be supported and adjusted.

It is also an object of the invention to provide one of such means with which a structure of the character referred to may be provided with means whereby the vario-coupler, variometer, or the like, may be secured to and supported upon a supporting wall.

Other objects and advantages of the invention will be pointed out in the detailed description thereof which follows, or will be apparent therefrom.

For the purpose of enabling a clearer and more ready understanding of the invention reference may be had to the accompanying drawing, in which I have illustrated one form of a convenient mechanical embodiment of the invention.

Figure 1:
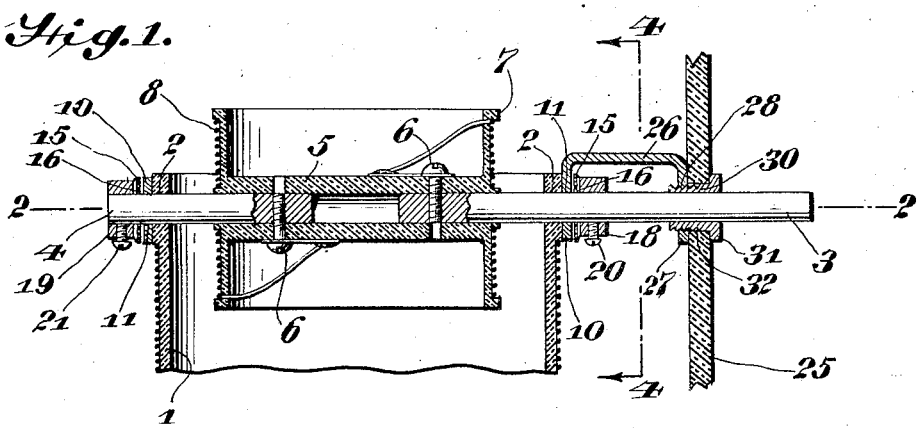
Fig. 1 is a view in vertical longitudinal section of the upper portion of a variocoupler provided with means embodying my invention.
Figure 2:
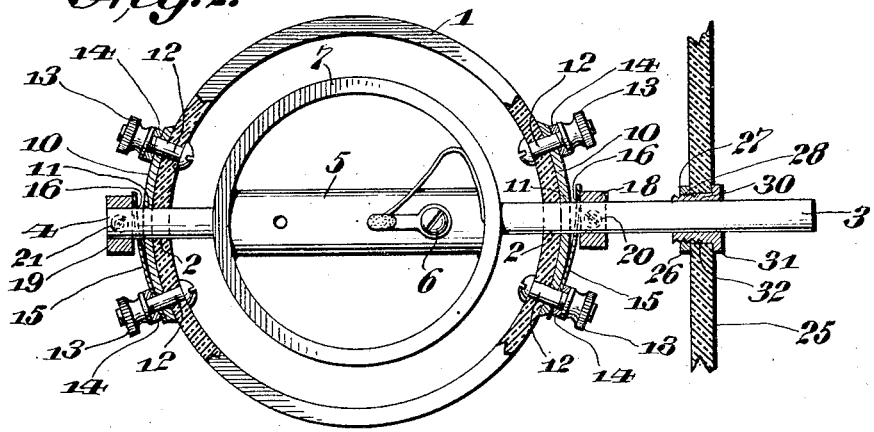
Fig. 2 is a horizontal transverse sectional view taken in the plane 2—2 of Fig. 1.
Figure 3:
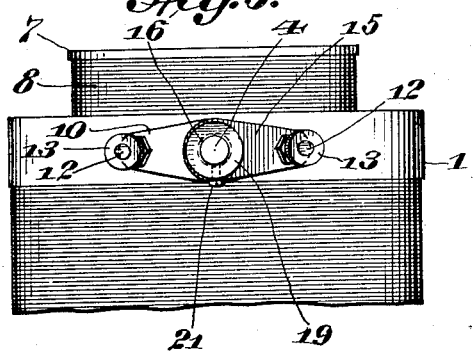
Fig. 3 is a view in elevation looking toward the right in Fig. 2.
Figure 4:
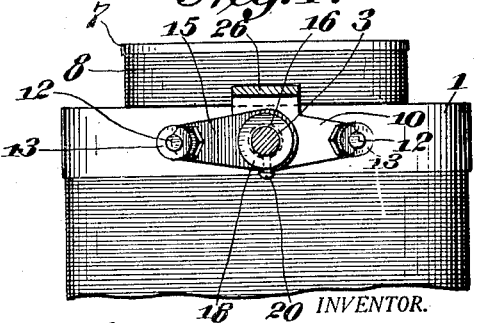
Fig. 4 is a sectional view taken on the line 4—4 of Fig. 1.

Referring to the drawing:

It will be observed that the device to which my invention is applied comprises a coil supporting frame member 1 of dielectric material, upon which primary and secondary coils may be wound, only one of which coils is shown. The frame or supporting member 1 is provided near one end with diametrically disposed openings 2 through which stub-shafts 3 and 4 extend. The inner ends of these shafts are spaced from each other and a rotor coil frame is mounted thereon, the said frame comprising a hollow shaft 5 into which the inner ends of the stub-shafts 3 and 4 project and to which they are secured by means of screw bolts 6. The hollow shaft 5 is integrally or otherwise connected with the cylindrical rotor coil supporting member or element 7. The rotor coil is indicated at 8.

Mounted upon the thickened end portion of the frame member 1 through which the openings 2 extend are metal plate bearing members 10 which are curved, so as to fit closely against the curved exterior surface of the tubular cylindrical frame member 1. These bearing plates 10 are each provided with an opening 11 which are in registry with the openings 2, previously referred to. The shafts 3 and 4, therefore, extend not only through the openings 2, but also through the openings 11 in the plates 10 which are in registry therewith.

The bearing plates 10 are secured to the cylindrical frame member 1 by means of bolts 12 which extend through openings through the frame member 1 and openings adjacent the opposite ends of the said bearing members. The latter are clamped and held against and in position upon the frame member 1 by means of nuts 13 which bear against washers 14 which are interposed between the said nuts 13 and bearing plates 10. These bolts 12 constitute binding posts to which the ends of conductors may be connected by means of the binding nuts and washers 13 and 14.

Each of two relatively narrow spring plates 15 is secured at one end between a washer 14 and a bearing plate 10. The said spring plates extend toward and beyond the stub-shafts 3 and 4, being provided with holes 16 at their outer ends through which the said shafts extend, as is clearly shown. These springs are supported in tangential relation to the exterior surfaces of the bearing plates 10. It will be noted that these spring plates are held firmly and fixedly in position by the action of the nuts 13 and the washers 14 associated therewith by which they are clamped against the said plates 10.

Mounted upon the shafts 3 and 4 are adjustable collars 18 and 19. These collars are held in adjusted position by means of binding screws 20 and 21, the inner ends of which contact with and bind against the surfaces of the shafts 3 and 4. By loosening these binding screws the collars may be adjusted inwardly or outwardly, as desired. The outer free ends of the spring plates 15, previously referred to, contact with the inner sides of these collars. Upon adjustment of these collars with respect to each other so that the distance between the inner sides thereof is slightly less than the normal distance between the spring plates 15 the latter will exert pressure against the said collars, so that a good electrical contact between the said spring plates and the collars is effected.

By adjusting the collars 18 and 19 upon the stub-shafts 3 and 4 the rotor coil, previously referred to, may be placed in exactly the position desired within the frame member 1, upon which primary and secondary coils are mounted, as stated.

One advantage of providing the bolts or binding posts at the opposite ends of the respective bearing plates 10 is that the connecting of the conductors with the device is facilitated.

For the purpose of providing a convenient means for supporting the device as a whole upon a wall or support such as 25 (which may be the front panel of a radio receiving set) one of the bearing plates 10 is provided with a laterally extending arm or bracket 26, the outer end of which is turned downward, as indicated at 27. The turned down portion 27 is substantially parallel with the opposing portion of the bearing plate 10 with which it is integrally connected. The said turned down portion is provided with a screw threaded opening 28 which is adapted to receive the inner screw threaded end of a hollow fastening member 30, the outer end of which is flanged, as indicated at 31. In mounting the device, as upon the front panel 25 of a receiving set, the outer end of the stub-shaft 3 is extended through an opening 32 in the wall 25, and thereafter the fastening member 30 is passed over the outer end of the shaft and is inserted through the opening 32 and is screwed into the opening 28 in the turned down end portion 27 of the bracket 26. The portion of the wall 25 surrounding the opening 32 is clamped between the flange 31 and the opposing turned down portion 27, previously referred to. It will be apparent that the bearing plate provided with the bracket including the turned down end portion 27 constitutes a most convenient means by which the device may be secured to and supported upon a wall support, such as the front panel of a radio receiving set.

It will be seen that by my invention comprising the bearing plates 10 I am enabled to provide firm and rigid bearings for the rotor stub-shafts 3 and 4 and also am enabled to provide a most convenient and efficient means for supporting devices of the character indicated upon a suitable wall support.

Having thus described my invention, what I claim and desire to secure by Letters Patent is:

1. In a device of the character described, the combination of a relatively stationary tubular coil supporting frame, curvilinear bearing plates mounted upon the exterior surface thereof in diametrically opposed relation to each other, each of said plates having openings extending therethrough in registry with openings through the said frame, a rotor coil, stub-shafts upon the inner ends of which said coil is supported, which shafts are journaled in the openings through the said bearing plates, one of the said bearing plates being provided with a bracket including an arm terminating at its outer end with a depending portion having a screw-threaded opening therethrough, which opening is in alinement with the opening in the last mentioned bearing plate, and through which opening extends the stub-shaft mounted in the last mentioned bearing opening, and means adapted to engage the said screw-threaded opening for securing the said device to a supporting wall.

2. In a device of the character described, the combination of a tubular cylindrical frame for supporting induction coils, said frame having diametrically disposed openings near one end thereof, bearing plates mounted upon said frame, which plates are provided with openings in registry with the openings through said frame, stub-shafts extending through said openings, a rotor coil support mounted upon the inner ends of said stub-shafts, one of the said bearing plates being provided with an outwardly extending bracket terminating in a portion substantially parallel with said plate, which portion is provided with a screw-threaded opening in alinement with the opening through said plates and through said frame, and one of the said stub-shafts extending through said opening, which shaft is adapted to extend through an opening in a wall support, and a nut having clamping flanges, which nut is adapted to extend over the outer end portion of the last mentioned stub-shaft, through the opening in the said wall support, and into screw-threaded engagement with the said screw-threaded opening, substantially as described.

In testimony that I claim the foregoing as my invention, I have hereunto signed my name this 6th day of May A. D., 1925.

GORDON O. WILKINSON.